United States Patent Office 3,003,073
Patented Oct. 3, 1961

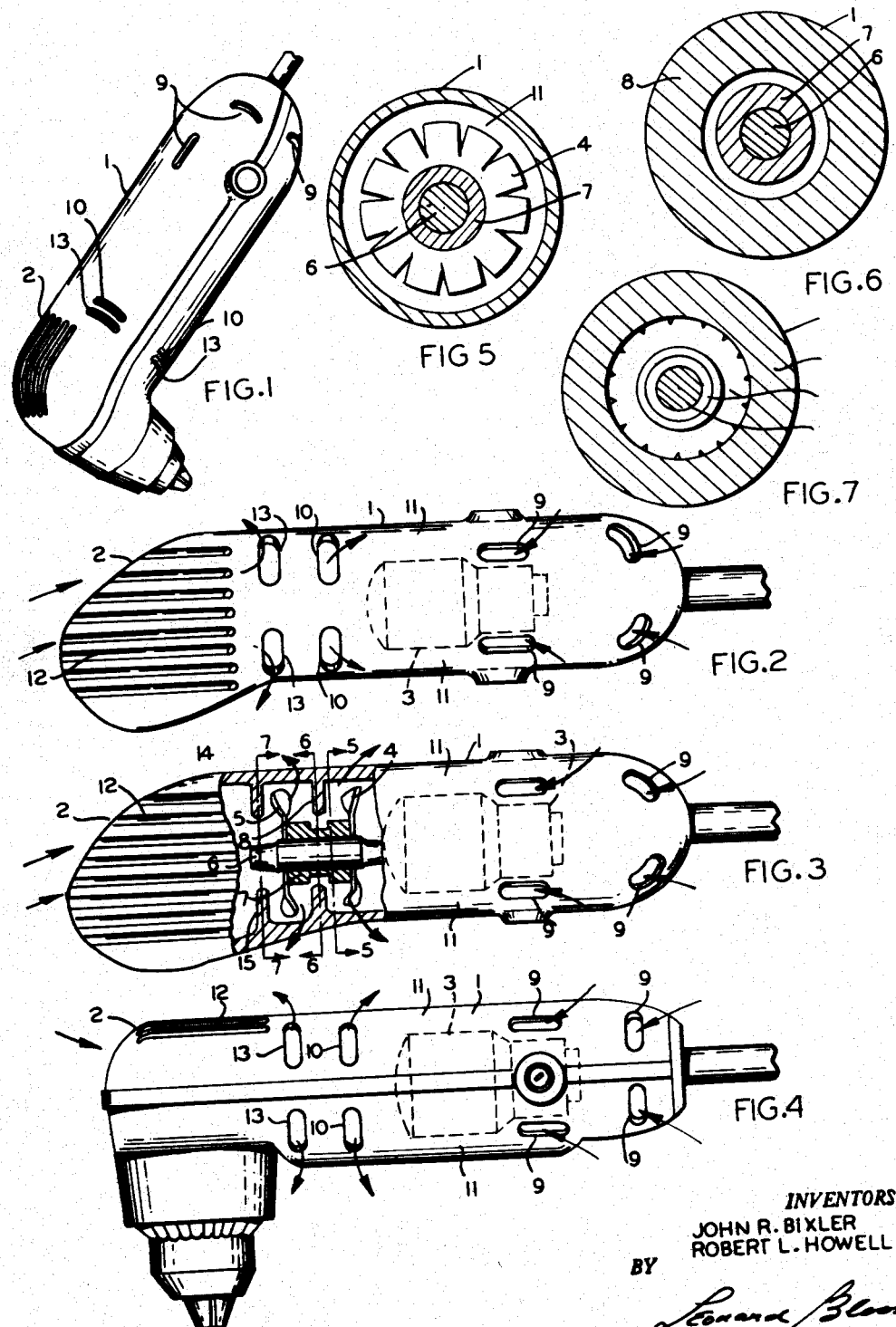

3,003,073
COOLING MEANS FOR PORTABLE
ELECTRIC TOOL
John R. Bixler and Robert L. Howell, Baltimore, Md., assignors to The Black and Decker Manufacturing Company, Towson, Md., a corporation of Maryland
Filed Mar. 20, 1959, Ser. No. 800,733
2 Claims. (Cl. 310—59)

The present invention relates to means for cooling a portable electric tool, and more particularly, to such a tool that utilizes a gear train to couple the electric motor to the tool or driven mechanism.

Portable electric tools generally do not have a direct-drive electric motor because the motor size is much too bulky at the desired speed; and invariably, such tools feature a high-speed, very small sized electric motor that is in turn coupled to the tool by means of an intervening gear train so as to produce a desired overall result of optimum driving speed and torque together with the lowest possible overall tool size. The electric motor is generally housed in the main tool case, and the gear train is housed in the portion of the case known as the gear case.

Heretofore, in the prior art, the tool is cooled by means of a single, continuous cooling circuit featuring a single fan that is usually mounted on the motor spindle forwardly of the motor armature. The fan is adapted to draw cooling air from the rear of the tool, over and around the motor, and to discharge the air forwardly in such a manner as to cool the gear case. The motor is cooled fairly adequately by this method, provided good design practices are used; but the air as it leaves the motor has absorbed almost all of the heat that it is capable of absorbing, with the result that the air that passes over the gear case is not capable of adequately cooling it. Consequently, the gear case overheats, the lubrication for the gears breaks down or is otherwise dissipated, and the gears themselves overheat and wear excessively, thus precipitating a failure. The situation is further aggravated where the tool is designed for continuous usage in heavy-duty industrial applications. Also, the design of some tools is such that the operator must grasp the tool at or near the gear case, which as it overheats, prohibits continuous usage. By using larger fans, or by using dual fans in tandem (mounted either adjacent to each other or on either extremity of the motor) but still being a part of the same air-flow pattern, or by optimizing the air-flow passageways, or in general, by using good design practices, better cooling results can be obtained; but only up to a limited point. For example, the size of the motor and the case necessarily limits the size of the fan or fans to be used; and thereafter, a need exists for a novel departure in cooling means that will adequately cool both the electric motor and the gear case so as to provide a compact, portable electric tool capable of even longer life and more reliable service.

Accordingly, it is an object of the present invention to provide in a portable electric tool, two separate cooling circuits, one each to cool the electric motor and the gear case, respectively. Each cooling circuit operates simultaneously and independently and is provided with separate air intake openings and separate air exhaust openings that are connected to each other by means of separate air-flow passageways. One air-flow passageway surrounds the electric motor and its associated components, while the other air-flow passageway surrounds the gear case. Suction means are provided in each cooling circuit; and means are also provided for preventing the suction means from interfering with each other during operation of the tool.

In the particular embodiment chosen to illustrate the present invention, two fans are mounted adjacent to each other on the motor spindle forwardly of the armature and disposed within the tool case intermediate the longitudinal extremities thereof. The fans have air-suction patterns opposite to each other so to each draw air from the respective extremities of the casing in towards the intermediate portion thereof. An annular inner baffle depends radially and inwardly from the case towards the motor spindle and is disposed between the adjacent, opposed fans. Respective air intake openings are provided in the case adjacent to the longitudinal extremities thereof, and respective circumferentially-spaced air exhaust openings are provided in the intermediate portion of the case radially adjacent to the fans and distributed on either side of the annular inner baffle. Respective air-flow passageways connect the respective air intake and exhaust openings. The motor-cooling fan draws cooling air from the air intake openings in the rear of the case, through the air-flow passageway that surrounds the motor and associated components, and discharges the air through the respective air exhaust opening in a direction back towards the rear of the case; while the cooling fan for the gear case draws cooling air from the air intake openings in the forward part of the case, through the air-flow passageway that surrounds the gear case, and discharges the air through the respective air exhaust opening in a direction back towards the forward part of the case.

The present invention may be more specifically illustrated by means of the following detailed description, taken in conjunction with the enclosed drawings, in which:

FIGURE 1 is a pictorial view of a typical portable electric tool;

FIGURE 2 is a top view of the tool, showing the respective air intake and exhaust openings and the respective air-flow patterns, and showing the motor and associated components in dotted lines;

FIGURE 3 is the same top view showing the fans mounted on the motor spindle and showing in sectional view, the annular inner baffle, the case, and the fan hub;

FIGURE 4 is a side view of the tool, showing the respective air intake and exhaust openings;

FIGURE 5 is a sectional view taken at line 5—5' of FIGURE 3, showing the fan mounting on the spindle;

FIGURE 6 is a sectional view taken at line 6—6' of FIGURE 3, showing the position of the annular inner baffle in relation to the fan hub; and FIGURE 7 is a sectional view taken at line 7—7' of FIGURE 3, showing a second annular inner baffle in relation to the gear case air-flow passageway.

With reference to FIGS. 1–5, there is illustrated a familiar type of portable electric tool suitable for right-angle drilling in work areas not ordinarily accessible to conventional electric drills. This type of portable electric tool is chosen to illustrate the teachings of the present invention in a specific embodiment; and the essence of the present invention is not to be limited thereby, but is to be adaptable to other types of portable electric tools. The tool is provided with a motor case 1 located in the main portion of the tool and a gear case 2 located forwardly in the tool. For ease and economy of manufacture, both the motor case 1 and the gear case 2 are formed by means of a split clam-shell design. Motor case 1 houses the motor 3, which is shown by dotted lines in FIGURES 2–4; and a pair of fans, 4 and 5, respectively, are mounted on motor spindle 6 by means of fan hub 7, as shown in sectional view in FIGURE 3. Fan hub 7 is made of a suitable metal and is pressed onto spindle 6 (which incidentally, is coupled to the gear train); and fans 4 and 5, likewise made of a suitable metal, are each pressed onto hub 7 and are brazed into place. The position of fan 4 on spindle 6 and hub 7 is shown in the sectional view of FIGURE 5.

The fans 4 and 5 are separated by inner annular baffle 8, as shown in FIGURES 3 and 6. Baffle 8 is made an integral part of case 1 for ease and economy of manufacture; and baffle 8 depends radially and inwardly from case 1 towards hub 7 so as to function as an intentional separation or bulkhead between fans 4 and 5, there being a sufficient amount of clearance between baffle 8 and hub 7 to allow hub 7 to rotate freely.

As shown in FIGURES 1–4, a plurality of air intake openings 9 are provided in the rear of motor case 1, and a plurality of air exhaust openings 10 are also provided in motor case 1, intermediate the extremities thereof, so as to be adjacent to fan 4. Air intake openings 9 communicate with air exhaust openings 10 by means of a connecting air-flow passageway 11 (shown diagrammatically in FIGURES 2–4) which surrounds and encloses motor 4 and its associated components. Fan 4, air intake openings 9, air exhaust openings 10, and air-flow passageway 11 thus comprise the motor cooling circuit.

Likewise, a plurality of slotted air-intake openings 12 are provided in gear case 2, and a plurality of air exhaust openings 13 are also provided between motor case 1 and gear case 2, as shown in FIGURES 2–4. Openings 12 and 13 communicate with each other by means of connecting air-flow passageway 14 (shown diagrammatically in FIGURES 2 and 3) which surrounds and encloses the outer surface of gear case 2. As shown in FIGURES 3 and 7, a second annular inner baffle 15 (integral with gear case 2) depends radially and inwardly towards spindle 6 and is positioned within passageway 14 between intake openings 12 and exhaust openings 13 for purposes of increased efficiency. Fan 5, air intake openings 12, air exhaust openings 13, and air-flow passageway 14 thus comprise the gear case cooling circuit.

Each of the fans 4 and 5 are pre-formed so as to have air-suction patterns opposite to each other. More specifically, fan 4 draws cooling air from the rear of the tool through intake openings 9 via passageway 11 and discharges the air through exhaust openings 10, as indicated by the small arrows in FIGURES 2–4. On the other hand, fan 5 draws cooling air from the forward portion of the tool over gear case 2 through the slotted intake openings 12 via passageway 14 and discharges the air through exhaust opening 13, as indicated by the second set of small arrows in FIGURES 2–4. It should be noted, however, that the operation of the fans 4 and 5 could be reversed, and the objects of the present invention could be accomplished just as efficiently. For example, motor 3 may be of the reversible type or else designed to rotate in an opposite direction, in which case fans 4 and 5 would then draw cooling air through the normal exhaust openings 10 and 13, respectively, and push the air over and through the separate motor and gear case cooling circuits to be discharged through the normal intake openings 9 and 12, respectively.

The present invention fulfills a need for an efficient cooling means for a portable electric tool in an economical and easy-to-manufacture method; and it is apparent that other embodiments and improvements thereof could be made to illustrate the essence of the present invention equally as well. For example, it is readily apparent that the precise location, shape, and design of the air intake and exhaust openings could be modified to suit the peculiar structural requirements of any particular tool. Moreover, the means used to isolate the separate cooling circuits could take on a variety of forms. For example, in the particular embodiment illustrated herein, annular inner baffle 8 may be made integral with fan hub 7 and be projected radially and outwardly therefrom with a suitable amount of clearance between its outer extremities and the inner surface of motor case 1. Or, the motor cooling circuit and the gear case cooling circuit could be isolated from each other by means of a continuous wall, wherein hub 7 would be made integral with motor case 1 and a suitable sleeve bearing would be press-fitted into hub 7 so as to allow spindle 6 to rotate freely. Obviously, other modifications and improvements could be made without departing from the basic spirit of the invention. Therefore, it is to be understood that within the scope of the appended claims, the invention may be practiced other than as specifically described.

I claim:

1. Cooling means for a portable electric tool comprising a cylindrical motor housing, a gear case forwardly of said motor housing, a motor in said motor housing, said motor having a spindle protruding forwardly therefrom towards said gear case, first and second opposed fans mounted on said spindle forwardly of said motor, said fans being axially spaced with respect to each other and said first fan being axially closer to said motor than said second fan, a first internal annular baffle intermediate said first and second fans and extending radially inwardly from said motor housing towards said spindle, said motor housing having a plurality of air intake openings rearwardly of said motor and further having a plurality of circumferentially-spaced air exhaust openings radially adjacent to said first fan, whereby an air cooling path is established for said motor, said gear case having a plurality of separate air intake openings forwardly of said second fan, said motor housing having a plurality of circumferentially-spaced separate air exhaust openings radially adjacent to said second fan and further having a second internal annular baffle extending radially inwardly intermediate said second fan and said gear case air intake openings, whereby a separate and independent air cooling path is established for said gear case.

2. Cooling means for a portable electric tool comprising a main housing including a cylindrical motor housing and further including an integral gear case forwardly of said motor housing, a motor in said motor housing, said motor having a spindle protruding forwardly therefrom towards said gear case, first and second opposed fans mounted on said spindle forwardly of said motor, said fans being axially spaced but relatively close to each other with said first fan being axially closer to said motor than said second fan, an internal annular baffle intermediate said first and second fans and extending radially inwardly from said main housing towards said spindle, said motor housing having a plurality of air intake openings rearwardly of said motor and further having a first series of circumferentially-spaced air exhaust openings radially adjacent to said first fan, said gear case including a top portion having a plurality of adjacent longitudinal slotted air intake openings therein, said motor housing further having a second series of circumferentially-spaced air exhaust openings radially adjacent to said second fans, said first and second series of air exhaust openings being intermediate the extremities of said main housing and further being axially-spaced but relatively close to each other, whereby cooling air is drawn by said first fan through said plurality of air intake openings in said motor housing over said motor to be expelled through said first series of air exhaust openings, and whereby cooling air is drawn by said second fan through said plurality of air intake openings in said gear case to be expelled through said second series of air exhaust openings.

References Cited in the file of this patent

UNITED STATES PATENTS

| | | |
|---|---|---|
| 1,685,677 | Maxwell | Sept. 27, 1928 |
| 2,155,082 | Decker | Apr. 18, 1939 |
| 2,196,952 | Bogaty | Apr. 9, 1940 |
| 2,436,930 | Mackmann | Mar. 2, 1948 |
| 2,456,571 | Turner et al. | Dec. 14, 1948 |
| 2,615,942 | Edman | Oct. 28, 1952 |

FOREIGN PATENTS

| | | |
|---|---|---|
| 596,056 | Germany | Apr. 25, 1934 |
| 634,066 | Germany | Aug. 20, 1936 |